United States Patent
Mitovski et al.

(10) Patent No.: US 11,042,395 B2
(45) Date of Patent: Jun. 22, 2021

(54) SYSTEMS AND METHODS TO MANAGE WORKLOAD DOMAINS WITH HETEROGENEOUS HARDWARE SPECIFICATIONS

(71) Applicant: VMware, Inc., Palo Alto, CA (US)

(72) Inventors: Velislav Mitovski, Sofia (BG); Radka Ilieva, Sofia (BG)

(73) Assignee: VMWare, Inc., Palo Alto, CA (US)

(*) Notice: Subject to any disclaimer, the term of this patent is extended or adjusted under 35 U.S.C. 154(b) by 204 days.

(21) Appl. No.: 16/258,460

(22) Filed: Jan. 25, 2019

(65) Prior Publication Data

US 2020/0241904 A1   Jul. 30, 2020

(51) Int. Cl.
   *G06F 9/455* (2018.01)
   *G06F 9/50* (2006.01)

(52) U.S. Cl.
   CPC .......... *G06F 9/45558* (2013.01); *G06F 9/505* (2013.01); *G06F 9/5044* (2013.01); *G06F 2009/4557* (2013.01)

(58) Field of Classification Search
   CPC .... G06F 9/45558; G06F 9/5044; G06F 9/505; G06F 2009/4557
   See application file for complete search history.

(56) References Cited

U.S. PATENT DOCUMENTS

| | | | |
|---|---|---|---|
| 2014/0244841 A1* | 8/2014 | Gulati | G06F 9/5072 709/226 |
| 2014/0280387 A1* | 9/2014 | Lin | G06F 16/1827 707/812 |
| 2018/0157532 A1 | 6/2018 | Kumar et al. | |

OTHER PUBLICATIONS

VMware vSAN Design and Sizing Guide 6.5, https://storagehub.vmware.com/export_to_pdf/vmware-r-virtual-santm-6-2-design-and-sizing-guide, 81 pgs., 2019.

* cited by examiner

*Primary Examiner* — Wissam Rashid
(74) *Attorney, Agent, or Firm* — Loza & Loza, LLP; Thomas H. Ham

(57) ABSTRACT

A system and method for automatic workload domain deployment in a computing environment uses hardware groups (HGs) formed from hardware specifications (HSs) for a plurality of free host computers in the computing environment to select the free host computers to deploy a workload domain. When a capacity requirement for the workload domain cannot be met with the free host computers belonging to one of the HSs, a particular HG from the HGs is identified that can meet the capacity requirement with the free hosts belonging to the HSs of the particular HG. The workload domain is then deployed to deploy using at least some of the free hosts belonging to the HSs of the particular HG.

20 Claims, 9 Drawing Sheets

SYSTEMS AND METHODS TO MANAGE WORKLOAD DOMAINS WITH HETEROGENEOUS HARDWARE SPECIFICATIONS

BACKGROUND

Virtualization of physical computer systems provides numerous benefits such as the execution of multiple virtual computer systems on a single physical computer, the replication of virtual computer systems, the live migration of virtual computer systems across multiple physical computers, etc. Such virtualization of physical computer system allows for creation of workload domains. A workload domain is an abstraction that can be applied to a number of different types of compute workloads, which allows an administrator to deploy capacity for specific workload types using a policy-driven approach on top of modular, standardized physical computers. A workload domain has a set of policies that are configurable by a user during the deployment process, such as desired levels of availability, performance and storage. In order to create a workload domain or expand an existing workload domain, an administrator typically has to manually select physical computers to be used for that workload domain from a pool of available physical computers.

Manual selection of physical computer for workload domain creation or expansion, however, can be time consuming and burdensome when the number of physical computers is high and the physical computers have varying capabilities and capacities. This is the situation developing in modern data centers as new computers are installed and old computers degrade. Over time, data centers can contain many hardware generations and computers having incompatible configurations.

SUMMARY

A system and method for automatic workload domain deployment in a computing environment uses hardware groups (HGs) formed from hardware specifications (HSs) for a plurality of free host computers in the computing environment to select the free host computers to deploy a workload domain. When a capacity requirement for the workload domain cannot be met with the free host computers belonging to one of the HSs, a particular HG from the HGs is identified that can meet the capacity requirement with the free hosts belonging to the HSs of the particular HG. The workload domain is then deployed to deploy using at least some of the free hosts belonging to the HSs of the particular HG.

A computer-implemented method for automatic workload domain deployment in a computing environment in accordance with an embodiment of the invention comprises receiving a capacity requirement for a workload domain, obtaining a plurality of hardware specifications (HSs) for a plurality of free host computers in the computing environment, the HSs specifying at least CPU information, storage configuration and memory size, when the capacity requirement cannot be met with the free host computers belonging to one of the HSs, forming a plurality of hardware groups (HGs) from the HSs, wherein each HG includes multiple HSs, identifying a particular HG from the HGs that can meet the capacity requirement with the free hosts belonging to the HSs of the particular HG, and deploying the workload domain using at least some of the free hosts belonging to the HSs of the particular HG. In some embodiments, the steps of this method are performed when program instructions contained in a non-transitory computer-readable storage medium are executed by one or more processors.

A system in accordance with an embodiment of the invention comprises memory and at least one processor configured to receive a capacity requirement for a workload domain, obtain a plurality of hardware specifications (HSs) for a plurality of free host computers in the computing environment, the HSs specifying at least CPU information, storage configuration and memory size, when the capacity requirement cannot be met with the free host computers belonging to one of the HSs, form a plurality of hardware groups (HGs) from the HSs, wherein each HG includes multiple HSs, identify a particular HG from the HGs that can meet the capacity requirement with the free hosts belonging to the HSs of the particular HG, and deploy the workload domain using at least some of the free hosts belonging to the HSs of the particular HG.

Other aspects and advantages of embodiments of the present invention will become apparent from the following detailed description, taken in conjunction with the accompanying drawings, illustrated by way of example of the principles of the invention.

DETAILED DESCRIPTION

Cloud computing is based on the deployment of many physical resources across a network, virtualizing the physical resources into virtual resources, and provisioning the virtual resources for use across cloud computing services and applications, which may involve deploying workload domains. Example systems for supporting workload domains are described in U.S. patent application Ser. No. 15/585,172, titled "METHODS AND APPARATUS TO MANAGE WORKLOAD DOMAINS IN VIRTUAL SERVER RACKS" filed May 3, 2017. For its descriptions of cloud computing technologies using workload domains and other teachings, patent application Ser. No. 15/585,172 is herein included by reference in its entirety.

Figure 1:
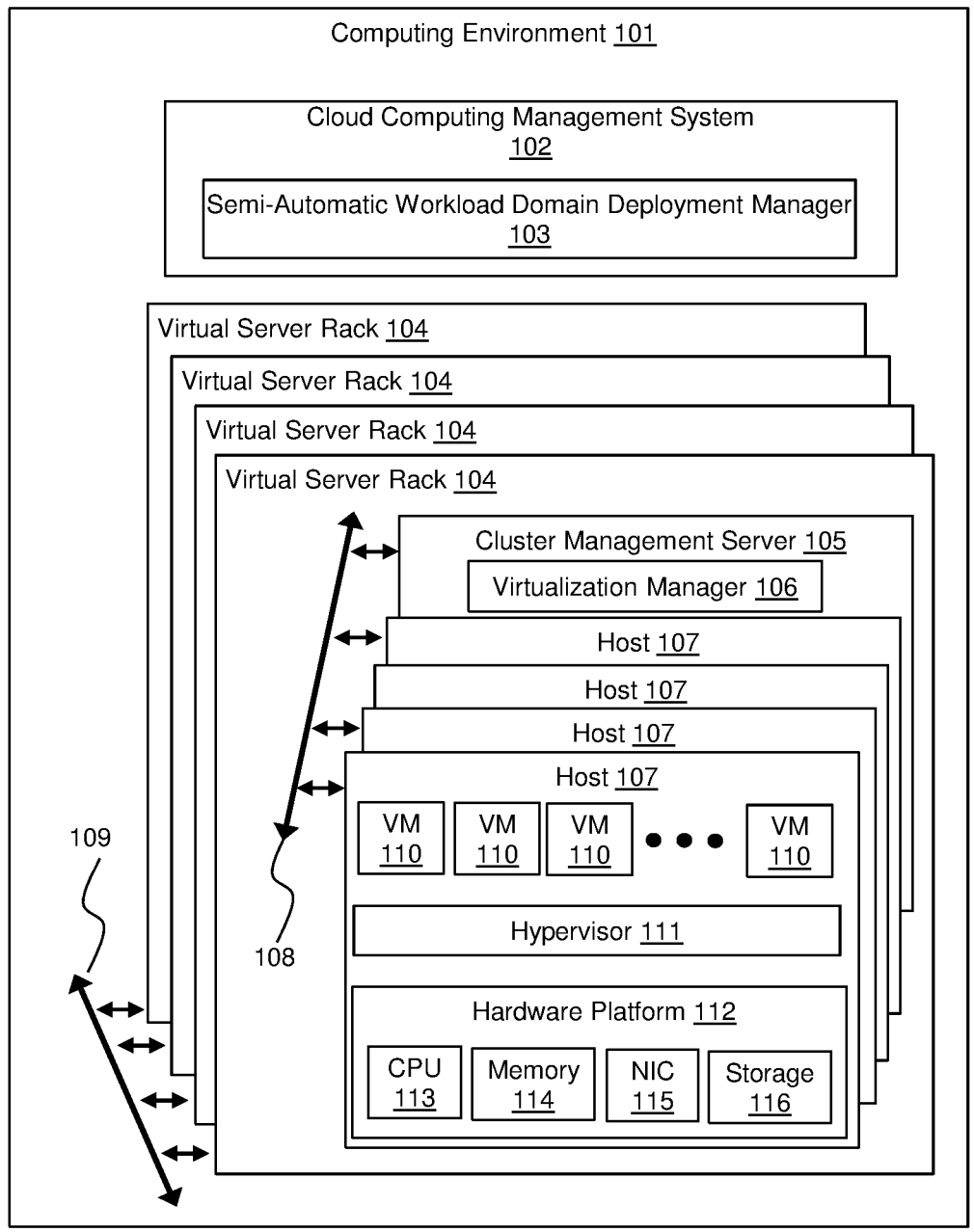
FIG. 1 is a block diagram of a computing environment with an automatic workload domain manager in accordance with an embodiment of the invention.

Turning now to FIG. 1, a block diagram of a computing environment 101 with an automatic workload domain manager 103 in accordance with an embodiment of the invention is shown. The computing environment 101 can be used to create and manage workload domains for cloud computing solutions. As described in detail below, the automatic workload domain manager 103 facilitates an automated process for selecting host computers with different hardware specifications for workload domain deployment of workload domains.

As shown in FIG. 1, the computing environment 101 includes a number of virtual server racks 104 with each virtual server rack containing a number of host computers 107, which are sometimes referred to herein simply as "hosts". The virtual server racks 104 are physical racks, holding physical computers, physical networking gear, and possibly other cloud computing elements, such as network attached storage (NAS) devices, storage area network (SAN) devices, or other storage devices. The network gear provides an internal network 108 inside each virtual server rack 104 over which the hosts 107 communicate. The network gear also provides an external network 109 over which the hosts 107 in different virtual server racks 104 can communicate with each other and the outside world.

The hosts 107 may be constructed on a server grade hardware platform 112, such as an x86 architecture platform. As shown, the hardware platform of each host may include conventional components of a computing device, such as one or more processors (e.g., CPUs) 113, system memory 114, a network interface 115, storage 116, and other I/O devices such as, for example, a mouse and a keyboard (not shown). The processor 113 is configured to execute instructions, for example, executable instructions that perform one or more operations described herein and may be stored in the memory 114 and the storage 116. The memory 114 is volatile memory used for retrieving programs and processing data. The memory 114 may include, for example, one or more random access memory (RAM) modules. The network interface 115 enables the host 107 to communicate with another device via a communication medium, such as a network 122 within the private cloud computing environment. The network interface 115 may be one or more network adapters, also referred to as a Network Interface Card (NIC). The storage 116 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage 116 is used to store information, such as executable instructions, cryptographic keys, virtual disks, configurations and other data, which can be retrieved by the host.

Each host 107 may be configured to provide a virtualization layer that abstracts processor, memory, storage and networking resources of the hardware platform 112 into virtual computing instances, e.g., virtual machines 110, that run concurrently on the same host. The virtual machines run on top of a software interface layer, which is referred to herein as a hypervisor 111, that enables sharing of the hardware resources of the host by the virtual machines. One example of the hypervisor 111 that may be used in an embodiment described herein is a VMware ESXi™ hypervisor provided as part of the VMware vSphere® solution made commercially available from VMware, Inc. The hypervisor 111 may run on top of the operating system of the host or directly on hardware components of the host. For other types of virtual computing instances, the host may include other virtualization software platforms to support those virtual computing instances, such as Docker virtualization platform to support software containers.

As illustrated in FIG. 1, one of the hosts 107 in each virtual server rack 104 can be designated as a cluster management server 105. The cluster management server 105 can run a virtualization manager 106 which can be software that interacts with the hypervisors 111 of the hosts 107 in the same virtual server rack 104 to thereby coordinate the creation, starting, running, shutdown, and deletion of virtual machines 110 and to otherwise provision, manage and monitor resources within that virtual server rack 104. The virtualization manager 106 can be an application program running on a virtual computing instance, such as a virtual machine, in the cluster management server 105 that can communicate with the hypervisors 111 of the hosts 107 in the same virtual server rack 104 using the internal network 108 and the external network 109. The cluster management server 105 may include additional virtual computing instances, such as virtual machines, running various other application programs. As an alternative, the virtualization manager 106 may be an application program running directly on the physical hardware of the cluster management server 105, not on a virtual computing instance.

The computing environment 101 also includes a cloud computing management system 102 with the automatic workload domain manager 103. The cloud computing management system 102 operates to provision, manage and monitor the physical and logical resources within the computing environment 101 to manage workload domains deployed in the computing environment. The cloud computing management system 102 can be implemented as software running on any computing system in the computing environment 101, such as one of the hosts 107 or one of the virtual machines 110 running on any host 107 in the virtual server racks 104. In some embodiments, the cloud computing management system 102 may be implemented as a group of cooperating software programs running on numerous hosts and/or virtual machines in the computing environment 101, and communicating via the networks 108 and 109.

The automatic workload domain manager 103 operates to execute an automatic workload domain deployment operation in which free hosts are selected for a workload domain based on hardware similarities. The automatic workload domain manager tries to select free hosts that have the same hardware specifications. However, if this is not possible, the automatic workload domain manager will select host computers with similar hardware specifications with consideration of other parameters, such as capacity, redundancy and performance. The automatic workload domain manager can be a component of the cloud computing management system 102, as illustrated in FIG. 1, or can be a separate software application that can interact with cloud computing management system. The workload domain manager and its operation are described in more detail below.

Figure 2:
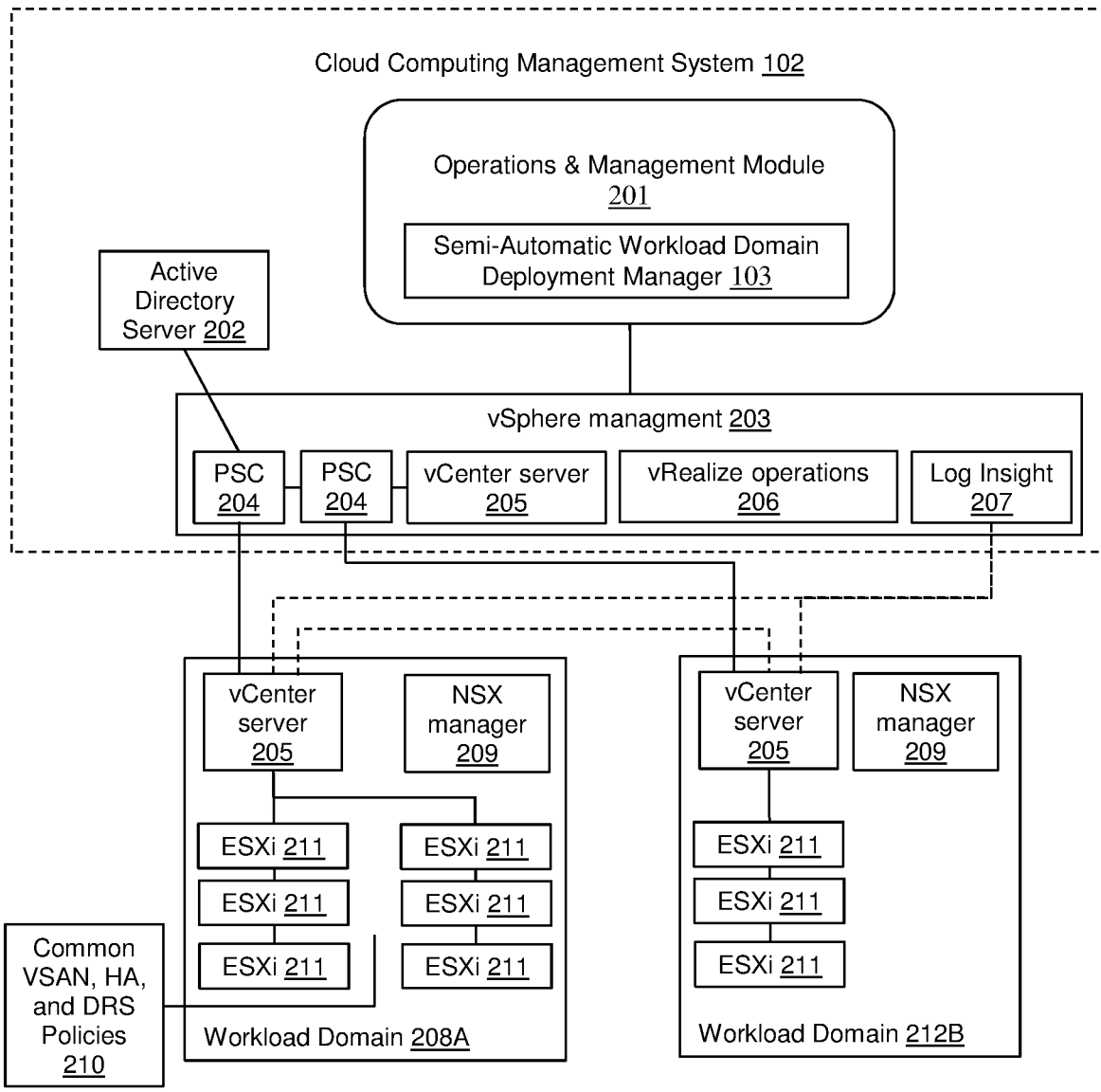
FIG. 2 illustrates components of a cloud computing management system in the computing environment in accordance with an embodiment of the invention.

FIG. 2 illustrates components of the cloud computing management system 102 in accordance with an embodiment of the invention. As shown in FIG. 2, the cloud computing management system 102 includes an operations and management module 201 with the automatic workload domain manager 103 and VMware vSphere® management module 203. In one implementation, the operations and management module 201 is a VMware Cloud Foundation™ (VCF) SDDC manager. These components of the cloud computing management system 102 operate to create and manage workload domains, such as workload domains 208A and 208B.

The workload domains 208A and 208B can be created based on user inputs that specify one or more of domain type, security, availability requirements, performance requirements, and capacity requirements. Based on these user inputs, the operations and management component 201 can determine whether deployment of the workload domains 208A and 208B is possible. If deployment is possible, the operations and management component 201 can deploy the workload domains 208A and 208B with suitable management components, capacity, and settings that meet the user-specified requirements with the assistance of the VMware vSphere® management module 203.

The VMware vSphere® management module 203 can use a suite of virtualization infrastructure components, such as platform services controllers (PSCs) 204, a vCenter® server 205, a vRealize® operations component 206, and a Log Insight™ component 207. The vCenter® server 205 is a centralized management application that administrators can use to manage ESXi™ hypervisors 211, which may be running on the hosts 107 in the virtual server racks 104. The VMware vRealize® operations component 206 is an example of a software platform that can help administrators build and manage heterogeneous hybrid clouds. The Log Insight™ component 207 is a tool that provides for the collection, viewing, managing, and analysis of log data such as syslog data generated within ESXi™ hypervisors 211. The PSC 204 can provide infrastructure security capabilities such as single sign on (SSO), which can be configured with an active directory server 202 that administrators can use to grant user access to the management applications in the vSphere management module 203.

As shown in FIG. 2, each of the workload domains 208A and 208B includes a number of the ESXi™ hypervisors 211 running on selected hosts 107 in the virtual server racks, which are managed by the vCenter® server 205 running in that workload domain. Each of the workload domains 208A and 208B also includes a VMware NSX® manager 209, which manages logical networking resources for that workload domain. Each of the workload domains 208A and 208B may be governed by policies 201, which may include common virtual storage area network (VSAN), (high availability) HA, and distributed resource scheduler (DRS) policies. VSAN policies can govern the properties of virtual storage made available to the hosts 107 or virtual machines 110. HA policies can govern the detection of failed hosts and virtual machines, and the relaunching of failed virtual machines. DRS policies can govern the migration of virtual machines amongst hosts based on virtual machine busyness and host capacities. These policies for each workload domains 208A and 208B may be specified and changed by user input.

In order to deploy workload domains, such as the workload domains 208A and 208B, in the computing environment 101, some of the available hosts 107 in the virtual server racks 104, which may have different hardware specifications, have to be selected for the workload domains. As described in detail below, the workload domain manager 103 facilitates an automated process of selection hosts for workload domain deployment, which may be for creating a new workload domain or expanding an existing workload domain.

Figure 3:
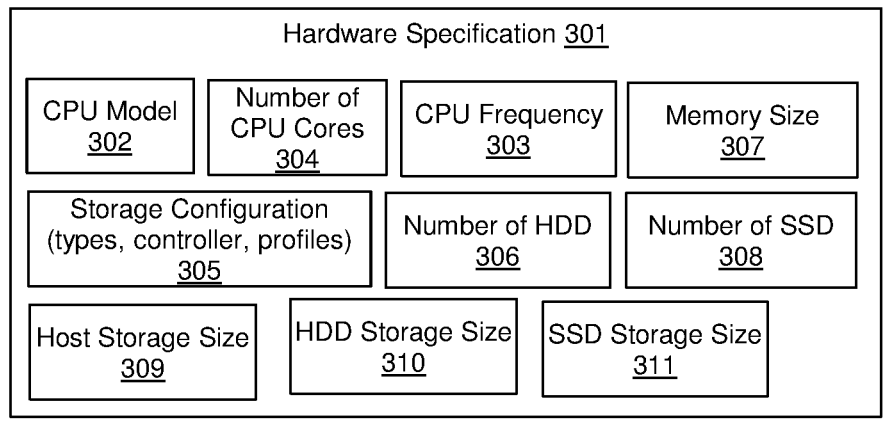
FIG. 3 illustrates an example of a hardware specification (HS) used by the automatic workload domain manager in accordance with an embodiment of the invention.

FIG. 3 illustrates an example of a hardware specification (HS) 301 used by the automatic workload domain manager 103 in accordance with an embodiment of the invention. An HS specifies the hardware properties of one or more hosts 107 in the computing environment 101. Each host in the computing environment belongs to exactly one HS. However, multiple hosts can belong to the same HS. All the hosts belonging to the same HS will have exactly the same hardware properties. A cluster of hosts for a workload domain or a workload domain cluster can have hosts belonging to one or more HS. The host properties specified by the HS 301 can include CPU information, such as CPU model 302, number of CPU cores 304 and CPU frequency 303. In addition, the host properties specified by the HS 301 can include memory size 307, storage configuration (storage types—e.g., hard disk drive (HDD), solid-state drive (SSD) and hybrid, controller, storage profiles) 305, number of HDD 306, number of SSD 308, host storage size or capacity 309, HDD storage size or capacity 310, and SSD size or capacity. Host CPU capacity can be calculated as the number of CPU cores multiplied by the CPU frequency. Host random access memory amount is the memory size 307. Host storage amount 309 is the total storage available from all HDDs and SSDs combined.

Figure 4:
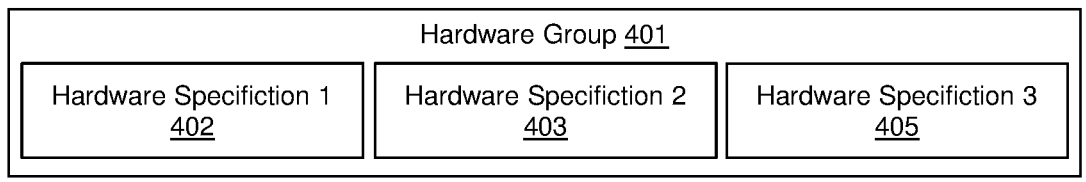
FIG. 4 illustrates an example of a hardware group (HG) used by the automatic workload domain manager in accordance with an embodiment of the invention.

FIG. 4 illustrates an example of a hardware group (HG) 401 used by the automatic workload domain manager 103 in accordance with an embodiment of the invention. The HG 401 is a set of HSs, such as the HS 301. The free hosts in the inventory of the computing environment 101 belong to one or more HSs. The HSs can be grouped into HGs with each HS in exactly one HG. A workload domain cluster can have hosts belonging to exactly one HS. The non-limiting example of FIG. 4 shows the HG 401 with three HSs 402, 403 and 404.

Figure 5:
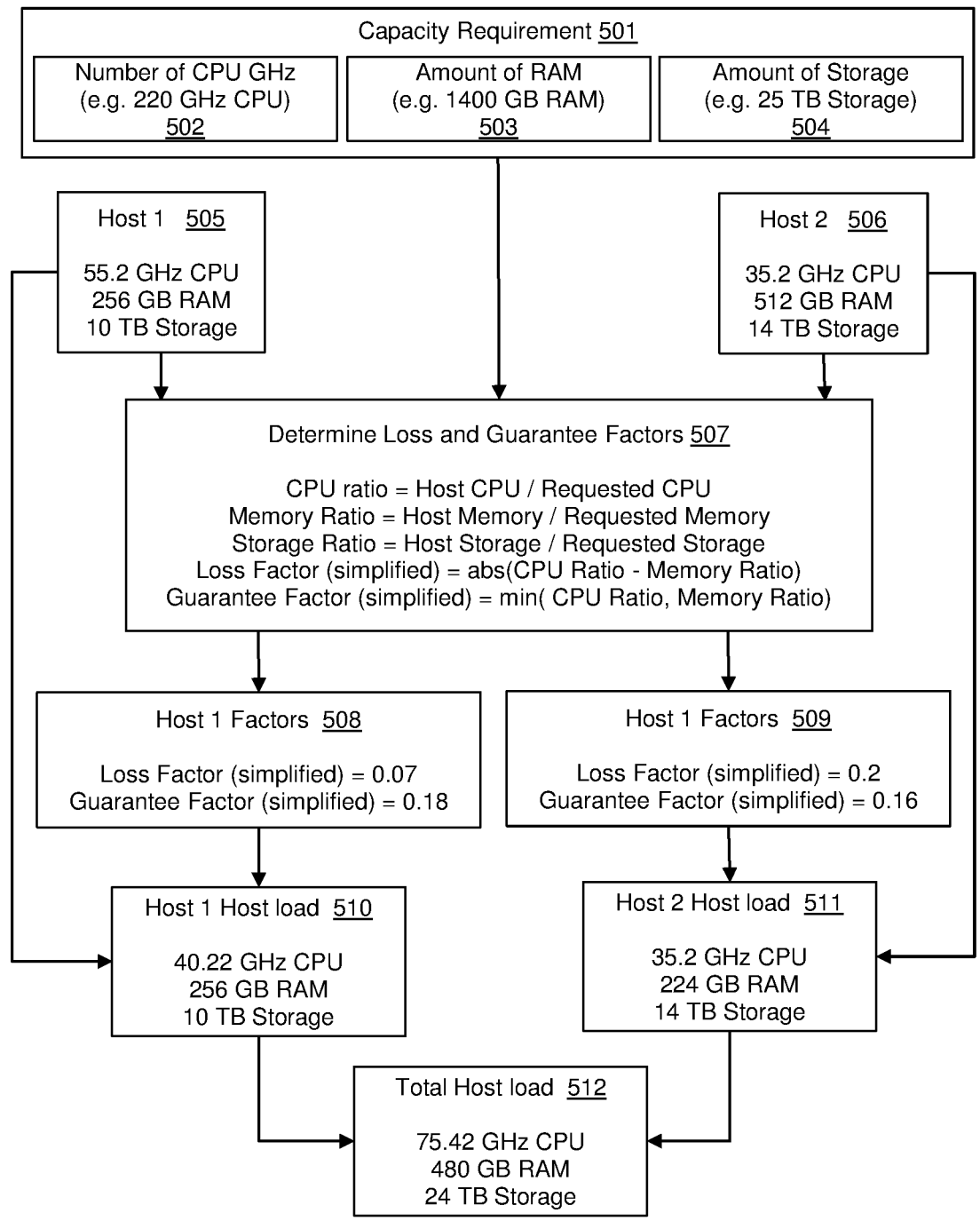
FIG. 5 is a high-level diagram illustrating loss factors, guarantee factors, and host loads, which may be used by the automatic workload manager to automatically select hosts for a workload domain, in accordance with an embodiment of the invention.

FIG. 5 is a high-level diagram illustrating loss factors, guarantee factors, and host loads, which may be used by the automatic workload manager 103 to automatically select hosts for a workload domain, in accordance with an embodiment of the invention. A user can provide a capacity requirement 501 for a domain type. Domain types can be an infrastructure as a service (DaaS) domain type, a platform as a service (PaaS) domain type, a desktop as a service (DaaS)/virtual desktop infrastructure (VDI) domain type, a development/test domain type, a production domain type, a Cloud Native domain type, an Open stack domain type, and a Big Data domain type. The capacity requirement 501 can specify the amount of storage 504 (e.g., in terms of megabytes (MB), gigabytes (GB), terabytes (TB), etc.), total amount of CPU operating speed 502 (e.g., in terms of megahertz (MHz), gigahertz (GHz), etc.), and the total amount of RAM 503. Total CPU operating speed for a single CPU is the sum of the speeds of all the cores in a CPU. For example, a host with a single 1 GHz CPU having six cores would be interpreted as having 6 GHz of CPU operating speed or simply 6 GHz CPU. A host with two such CPUs would be interpreted as having 12 GHz CPU.

The capacity requirement 501 specifies 220 GHz as the number of CPU GHz 502, 1400 GB RAM as the amount of RAM 503, and 25 TB storage as the amount of storage 504. As such the required CPU capacity for the desired workload domain is 220 GHz, the required RAM amount for the workload domain is 1400 GB, and the required storage amount is 25 TB. In FIG. 5, two hardware specifications are shown. The first HS 505 indicates a host having 55.2 GHz CPU, 256 GB RAM, and 10 TB storage. The second host HS 506 indicates a host having 35.2 GHz CPU, 512 GB RAM, and 14 TB storage. The capacity requirement 501, the first host HS 505, and the second host HS 506 are used to determine loss and guarantee factors 507 for each host. The CPU ratio is the CPU GHz of a host divided by the requested number of CPU GHz 502. The memory ratio is the host memory size 307 divided by the requested amount of RAM 503. The storage ratio is the host storage amount 309 divided by the requested amount of storage 504. In this non-limiting example, the values provided are rounded to a few significant digits while the calculations are performed with many more significant digits. For the first host, the CPU ratio, memory ratio, storage ratio, loss factor and guarantee factor are 0.25, 0.18, 0.4, 0.07, and 0.18, respectively. For the second host, the CPU ratio, memory ratio, storage ratio, loss factor and guarantee factor are 0.16, 0.37, 0.56, 0.21, and 0.16, respectively.

The host load for each host 505, 506 or how much load can be placed on each host can be determined by multiplying the values in the capacity requirements by the guarantee factor. The host load of the first host is 40.22 GHz CPU, 256 GB RAM, and 10 TB storage. The host load of the second host is 35.2 GHz CPU, 224 GB RAM, and 14 TB storage. The loss factors, guarantee factors, and host loads of this example are simplified in that the storage ratio is not considered and because the host loads indicate the respective host's total storage. The total host load for a workload domain is the sum of the host loads of the hosts in the workload domain. In the illustrated example, a workload domain having the first host and the second host has a total host load 512 of 75.42 GHz CPU, 480 GB RAM, and 24 TB storage. The capacity requirement 501 is met when the CPU GHz, RAM, and storage of total host load 512 are at least as large as those of the capacity requirement 501. Thus, in the illustrated example, additional hosts must be added to the workload domain to satisfy the capacity requirement 501.

Figure 6:
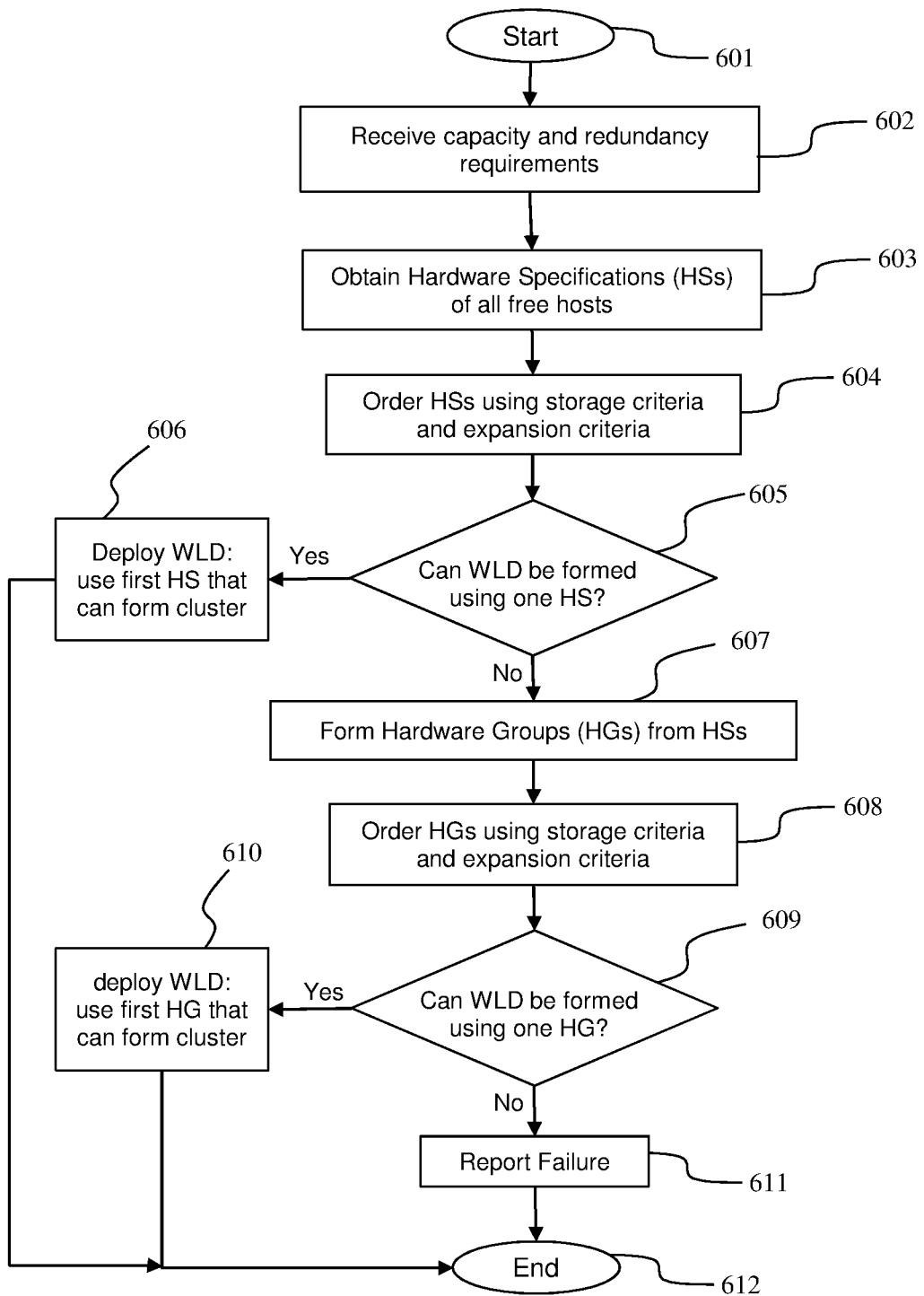
FIG. 6 illustrate a process flow diagram of an automatic workload domain deployment operation for a new workload domain executed by the automatic workload domain deployment manager in accordance with an embodiment of the invention.

FIG. 6 is a process flow diagram of an automatic workload domain deployment operation for a new workload domain (WLD) executed by the automatic workload domain manager 103 in accordance with an embodiment of the invention. At block 601, the automatic workload domain deployment operation is started in response to a user request to deploy the new workload domain. Next, at block 602, user-specified capacity and redundancy requirements for the workload domain are received, which will be used to select the appropriate HS, HG and/or hosts for the workload domain. A redundancy requirement specifies the number of minimum hosts for the workload domain and the location of those hosts. In an embodiment, there may be three possible redundancy requirements for user to specify, as shown in the following table.

| Redundancy | Host location | Min number of hosts |
| --- | --- | --- |
| High | Single rack | 5 |
| Normal | Multi rack | 3 |
| Low | Multi rack | 3 |

Next, at block 603, host specifications (HSs) of all free hosts 107 in the computing environment 101 are obtained. In an embodiment, the HSs of all free hosts may be formed by the automatic workload domain manager 103 using information from the vSphere management module 203.

Next, at block 604, the HSs are ordered using storage criteria and expansion criteria. In an embodiment, the storage criteria include storage criteria values of "Prefer Hybrid" and "Prefer All-Flash" so that the HSs are ordered based on the type of storage and storage capacity. In another embodiment, the storage criteria include storage criteria values of different storage profiles as defined by VSAN functionality. In an embodiment, the expansion criteria include expansion criteria values of "Prefer biggest group" and "Prefer smallest group" so that the HSs are ordered based on the number of hosts that belong to the HSs. The ordering of the HSs is based on a combination of a storage criteria value and an expansion criteria value so that the first HS is the HS that best conforms to that combination of storage and expansion criteria values. Thus, for a combination of "Prefer All-Flash" and "Prefer biggest group" values, the best HS may specify all flash storage with the largest storage capacity and the largest number of hosts that belong to that HS, the second best HS may specify all flash storage with the second largest capacity and/or the second largest number of hosts that belong to that HS, and so on. The exact combination of storage and expansion criteria values for the HS ordering may be preset or user selected at the operations and management module 201. In an embodiment, the exact combination of storage and expansion criteria values is defined by the workload domain (WLD) performance setting, as shown in the following table.

| WLD Performance | Storage criteria | Expansion criteria |
| --- | --- | --- |
| High | Prefer All-Flash | Prefer biggest group |
| Standard | Prefer Hybrid | Prefer biggest group |
| Development | Prefer Hybrid | Prefer smallest group |

Next, at block 605, the HSs are checked to see if any one of the HSs can be used to form a cluster of hosts for the workload domain based on the user-specified capacity and redundancy requirements for the workload domain. In an embodiment, the HSs are individually checked in order starting from the best HS, the second best HS and so on. If the workload domain can be formed using one HS, the workload domain is deployed using the first HS that can be used to form a cluster of host computers belonging to that first HS for the workload domain, at block 606. The host computers can be added to the workload domain to satisfy the capacity requirement in the manner similar to the example illustrated in FIG. 5. The operation then comes to an end, at block 612.

If the workload domain cannot be formed using one HS, all possible HGs are formed from the HSs, at block 607. The HGs are formed by inspecting the hardware properties specified in the HSs and grouping the HSs together to create the HGs based on the hardware properties, e.g., same CPU model and same storage type. Next, at block 608, the HGs are ordered using storage criteria and expansion criteria in a similar manner as described above with respect to HSs.

Next, at block 609, the HGs are checked to see if any one of the HGs can be used to form a cluster of hosts for the workload domain based on the user-specified capacity and redundancy requirements for the workload domain. In an embodiment, similar to the HSs, the HGs are individually checked in order starting from the best HG, the second best HG and so on. If the workload domain cannot be formed using one HG, a failure is reported, at block 611. The operation then comes to an end, at block 607.

However, if the workload domain can be formed using one HG, the workload domain is deployed using the first HG that can be used to form a cluster of host computers for the workload domain, at block 610. In an embodiment, a group of HSs in that first HG is formed and used to form a cluster of host computers for the workload domain, which is described below with reference to FIG. 7. The operation then comes to an end, at block 612.

Figure 7:
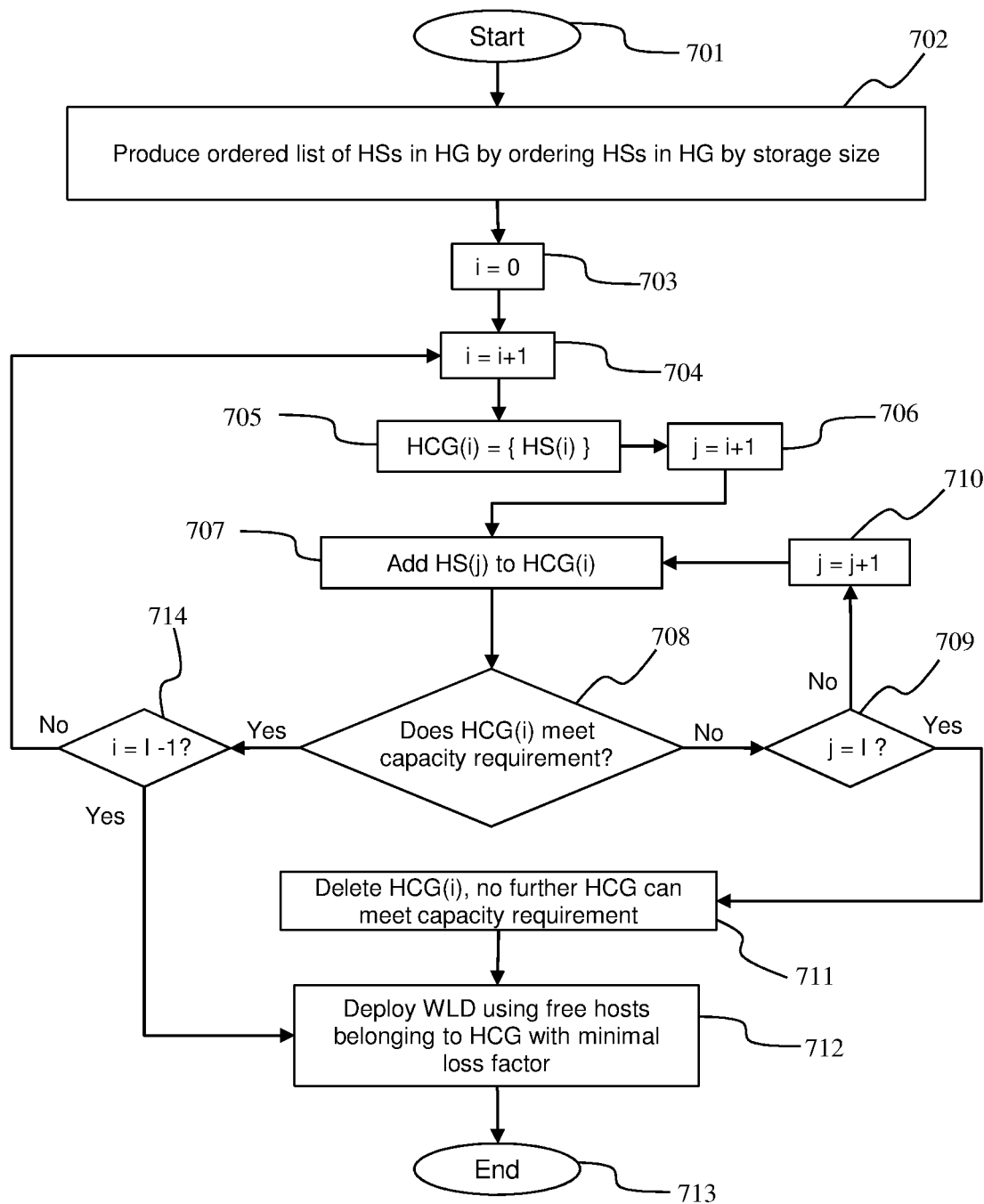
FIG. 7 is a process flow diagram illustrating a process to select HSs of a particular HG to form a cluster of host computers for a workload domain in accordance with an embodiment of the invention.

FIG. 7 is a process flow diagram illustrating a process to select HSs of a particular HG to form a cluster of host computers for the workload domain, which is executed at block 610 in the automatic workload domain deployment operation illustrated in FIG. 6, in accordance with an embodiment of the invention. Thus, in this description, the HG of interest is the first HG that can be used to form a cluster of host computers for the workload domain. As described below, this process operates by creating a set of host cluster groups (HCGs) using the HSs of the HG and identifying the HCGs capable of meeting the user-specified capacity requirement for the workload domain. This process prefers smallest HS count, smallest difference between disk sizes and minimal loss factor to form a cluster of host computers for the workload domain The process begins at block 701 as part of the automatic workload domain deployment operation illustrated in FIG. 4. Next, at block 702, an ordered list of the HSs in the HG is produced by ordering the HSs within the HG by storage size to identify HS(1) through HS(I), where HS(i+1) has less storage than HS(i). As such, there are I HSs formed into a list of HS(1), HS(2), . . . , HS(I). At block 703, a counter, i, is set to zero, which is then incremented by one, at block 704. Next, at block 705, HCG(i) is initialized by setting HCG(i) ={HS(i)}. At block 706, another counter, j, is set to j=i+1.

Next, at block 707, HS(j) is added to HCG(i), which is now a set of two HSs. At block 708, HCG(i) is evaluated to determine if there are enough free hosts belonging to HSs in HCG(i) to form the workload domain. If not, a check is made whether j=I, at block 709, indicating no more HSs can be added to HCG(i).

If j=I, HCG(i) is deleted, at block 711, because the workload domain cannot be formed using HCG(i). Furthermore, no further HCG(i) will be able meet the capacity requirement of the workload domain. Next, at block 713, the workload domain is deployed using the HCG with the minimum loss factor among the remaining HCGs. The loss factor for an HCG is derived by selecting hosts belonging to the HSs of that HCG to form a cluster of hosts with lowest possible loss factor. The process then comes to an end, at block 713.

However, if j<I, meaning more HSs can be added to HCG(i), then j is incremented by one, at block 710. The process then loops back to block 707, where HS(j) is added to HCG(i). Here, the two counters i and j are used with HCG(i) to iteratively add additional HSs to the HCG until the capacity requirement is met or until there are no more HSs to add when j=I.

Turning back to block 708, if there are enough free hosts belong to HSs in HCG(i) to form the workload domain, then a check is made whether i=I-1, at block 714. If so, the process proceeds to block 712, where the workload domain is deployed using the free hosts belonging to HCG with the minimum loss factor among the remaining HCGs. The process then comes to an end, at block 713.

Figure 8:
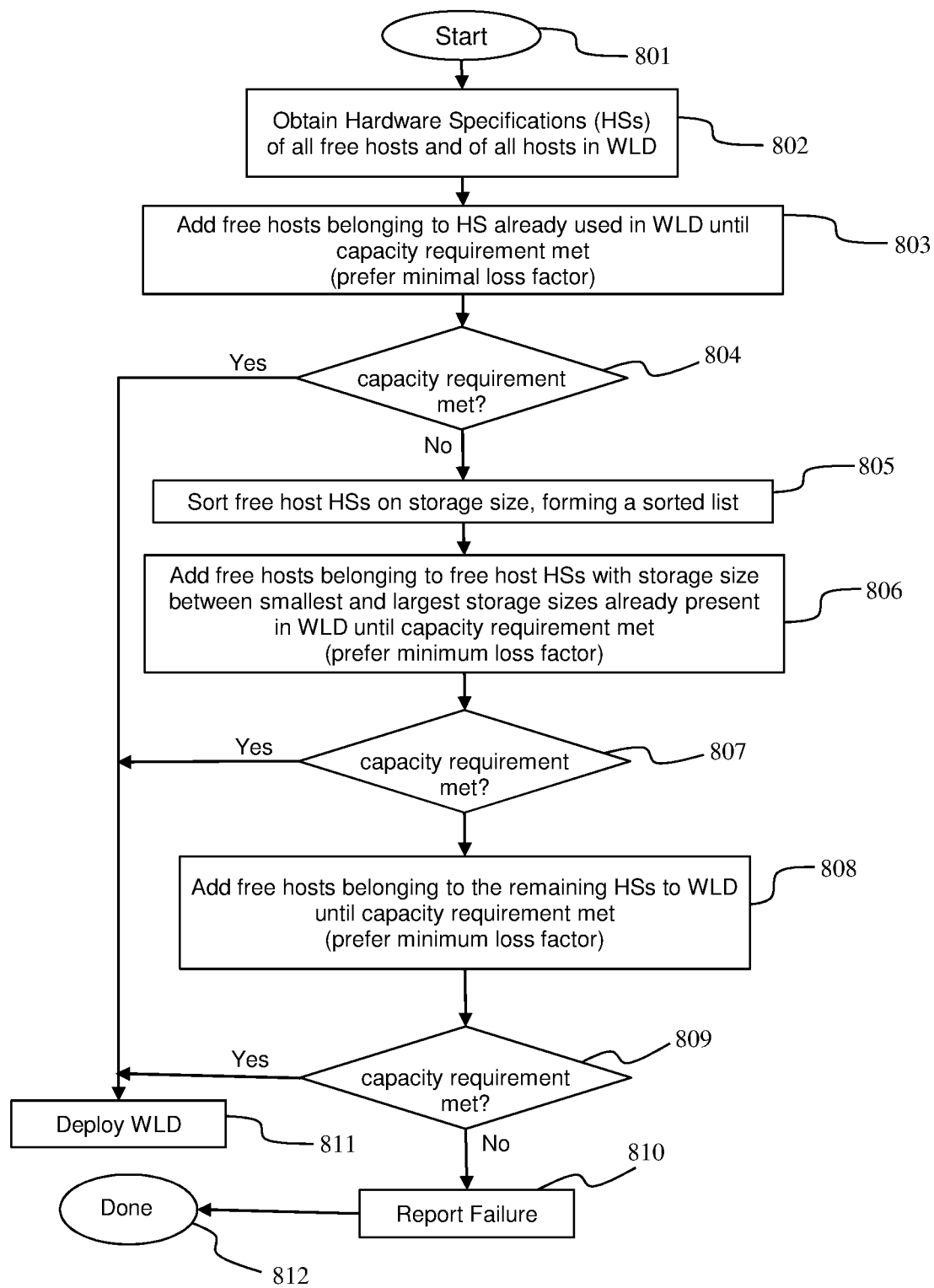
FIG. 8 is a process flow diagram of an automatic workload domain deployment operation to expand an existing workload domain executed by the automatic workload domain manager in accordance with an embodiment of the invention.

FIG. 8 is a process flow diagram of an automatic workload domain deployment operation to expand an existing workload domain executed by the automatic workload domain manager 103 in accordance with an embodiment of the invention. At block 801, the automatic workload domain deployment operation is started in response to a user request to increase the capacity requirements for the existing workload domain. Next, at block 802, the HSs for all the free hosts in the computing environment 101 and for all the hosts already in the workload domain are obtained. At block 803, the free hosts belonging to the same identical HS as a host already in the workload domain are added to the workload domain until the user-specified capacity requirement is met. In an embodiment, the free hosts that yield the smallest loss factor are preferred, and thus, are added first to the workload domain. By adding hosts belonging to the same HSs as the hosts already in the workload domain, no additional compatibility issues are introduced.

Next, at block 804, a check is made whether the user-specified capacity requirement has been met. If so, the process proceeds to block 811, where the workload domain is deployed using the added hosts. The process then comes to an end, at block 812.

However, if the user-specified capacity requirement has not been met, the process proceeds to block 805, where the remaining HSs for the free hosts are sorted based on storage size, forming a sorted list. Next, at block 806, the free hosts belonging to the HSs with storage sizes between the smallest and the largest storage sizes already present in the workload domain are added to the workload domain in the order of decreasing storage sizes until the user-specified capacity requirement is met. In an embodiment, the free hosts that yield the smallest loss factor are preferred, and thus, are added first to the workload domain.

Next, at block 807, a check is made whether the user-specified capacity requirement has been met. If so, the process proceeds to block 811, where the workload domain is deployed using the added hosts. The process then comes to an end, at block 812.

However, if the user-specified capacity requirement has not been met, at the block 807, the process proceeds to block 808, where the free hosts belonging to the remaining HSs are added to the workload domain until the user-specified capacity requirement is met. The hosts belonging to the HS with closest storage size from the previously processed HS (which may be the largest storage size) may be added first, followed by the hosts belonging to the next HS on the sorted list. In an embodiment, the free hosts that yield the smallest loss factor are preferred, and thus, are added first to the workload domain.

Next, at block 809, a check is made whether the user-specified capacity requirement has been met. If so, the process proceeds to block 811, where the workload domain is deployed using the added hosts. The process then comes to an end, at block 812. If not, the process proceeds to block 810, where a failure is reported having failed to expand the workload domain meeting the new capacity requirement. The process then comes to an end, at block 812.

Figure 9:
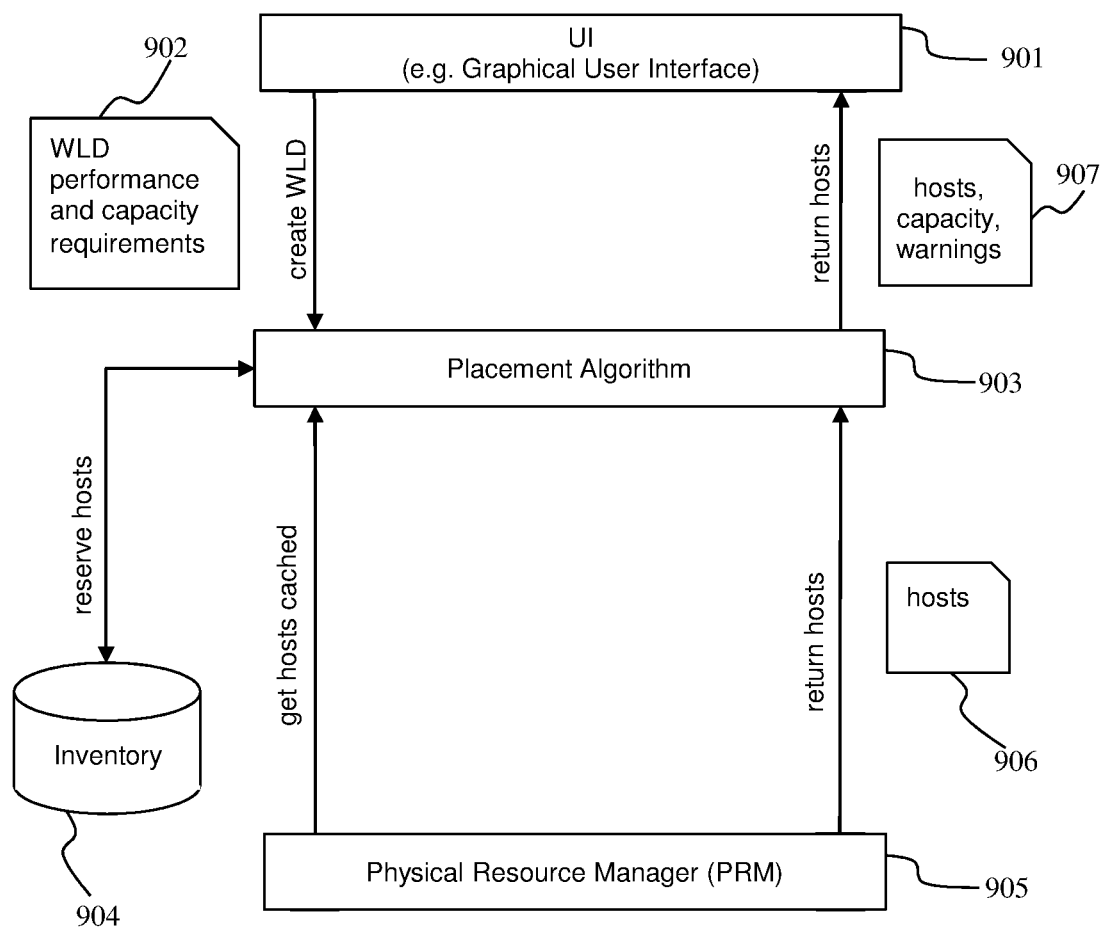
FIG. 9 illustrates an environment in which automatic selection of a plurality of hosts for a new or existing workload domain can be achieved in accordance with an embodiment of the invention.

Turning now to FIG. 9, an environment in which automatic selection of a plurality of hosts for a new or existing workload domain can be achieved in accordance with an embodiment of the invention. As discussed above, automatic selection of a plurality of hosts for a workload domain is performed by the automatic workload domain manager 103 implementing the process flows of FIGS. 6-8.

As shown in FIG. 9, a user can provide workload domain (WLD) performance and capacity requirements 902 using a user interface (UI) 901, which include a graphical user interface. In some embodiments, the user may also provide workload domain redundancy requirement. A placement algorithm 903, which is executed by the automatic workload domain manager 103 can receive the performance and capacity requirements 902 and interact with a physical resource manager 905, which may reside in the vSphere management module 203, to select hosts 906 from an inventory 904 of free hosts in the virtual server racks 104. The placement algorithm can implement the process flows of FIGS. 6-8 by which HSs and HGs are created and used to select hosts for a workload domain. The placement algorithm can inform the user, by way of the UI, of the hosts, capacity, and warnings 907 resulting from the automated selection of hosts. Here, the warnings could be provided by the physical resource manager 905 to the placement algorithm 903, which then passes them to the UI 901.

Figure 10:
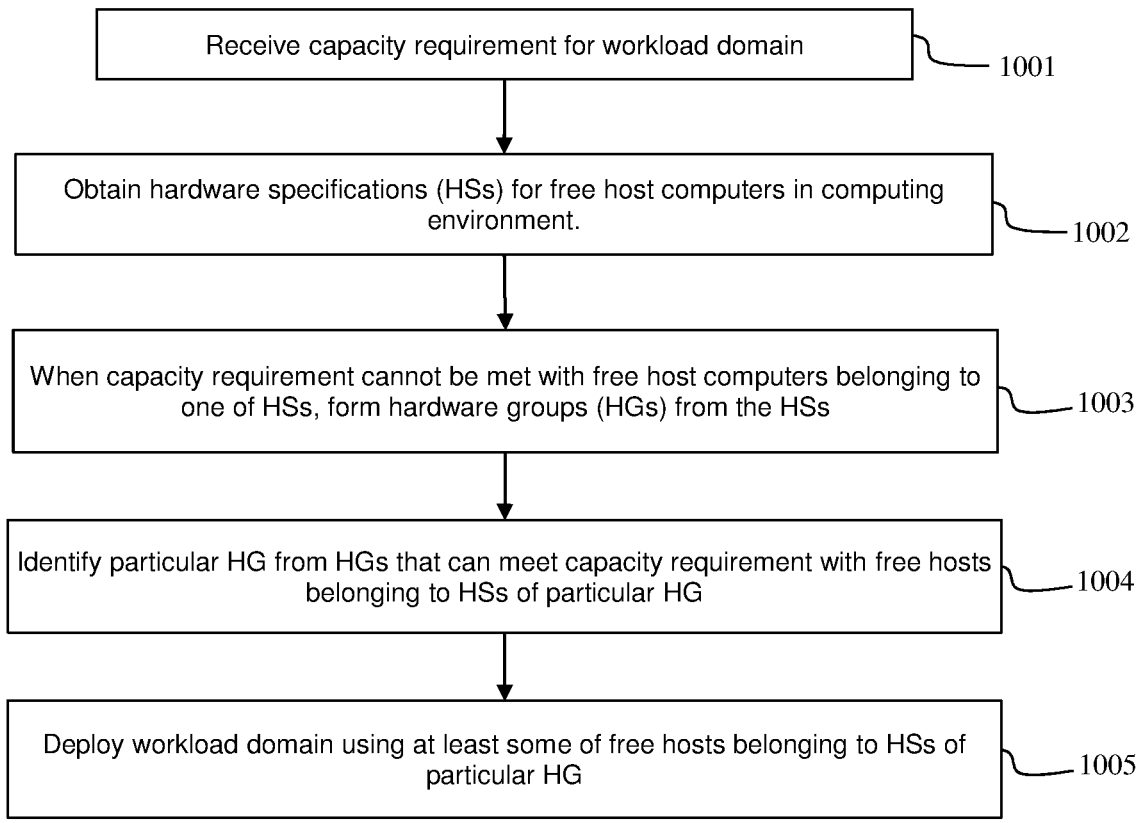
FIG. 10 is a flow diagram of a computer-implemented method for automatic workload domain deployment in a computing environment in accordance with an embodiment of the invention.

A computer-implemented method for automatic workload domain deployment in a computing environment in accordance with an embodiment of the invention is described with reference to a flow diagram of FIG. 10. At block 1001, a capacity requirement for a workload domain is received. At block 1002, a plurality of hardware specifications (HSs) for a plurality of free host computers in the computing environment is obtained. The HSs specify at least CPU information, storage configuration and memory size. At block 1003, when the capacity requirement cannot be met with the free host computers belonging to one of the HSs, a plurality of hardware groups (HGs) is formed from the HSs, wherein each HG includes multiple HSs. At block 1004, a particular HG from the HGs that can meet the capacity requirement with the free hosts belonging to the HSs of the particular HG is identified. At block 1005, the workload domain is deployed using at least some of the free hosts belonging to the HSs of the particular HG.

The components of the embodiments as generally described in this document and illustrated in the appended figures could be arranged and designed in a wide variety of different configurations. Thus, the description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for automatic workload domain deployment in a computing environment, the computer-implemented method comprising:
   receiving a capacity requirement for a workload domain;
   obtaining a plurality of hardware specifications (HSs) for a plurality of free host computers in the computing environment, the HSs specifying at least CPU information, storage configuration and memory size;
   when the capacity requirement cannot be met with the free host computers belonging to one of the HSs, forming a plurality of hardware groups (HGs) from the HSs, wherein each HG includes multiple HSs;
   identifying a particular HG from the HGs that can meet the capacity requirement with the free hosts belonging to the HSs of the particular HG; and
   deploying the workload domain using at least some of the free hosts belonging to the HSs of the particular HG.

2. The computer-implemented method of claim 1, further comprising:
   when the capacity requirement can be met with the free host computers belonging to a particular HS of the HSs, deploying the workload domain using at least some of the free hosts belonging to that particular HS.

3. The computer-implemented method of claim 1, further comprising:
   ordering the HSs using at least one of a storage criteria value and an expansion criteria value; and
   determining whether the capacity requirement can be met with the free host computers belonging to each of the HSs in an order resulting from the ordering.

4. The computer-implemented method of claim 1, further comprising:
   ordering the HGs using at least one of a storage criteria value and an expansion criteria value; and
   determining whether the capacity requirement can be met with the free host computers belonging to each of the HGs in an order resulting from the ordering.

5. The computer-implemented method of claim 1, wherein deploying the workload domain using at least some of the free hosts belonging to the HSs of the particular HG comprises:
   ordering the HSs of the particular HG by storage size;
   forming a plurality of host cluster groups by adding some of the HSs of the particular HGs to the host cluster groups; and
   deploying the workload domain using at least some of the free hosts belonging to the HSs of one of the host cluster groups.

6. The computer-implemented method of claim 5, wherein forming the plurality of host cluster groups includes adding the HSs of the particular HGs to a particular host cluster group of the host cluster groups one by one until the capacity requirement can be met with some of the free host computers belonging to that particular cluster group.

7. The computer-implemented method of claim 1, further comprising:
   after forming the workload domain, receiving a new capacity requirement for the workload domain; and
   adding to the workload domain the free hosts belonging to the same HSs already used for the workload domain until the new capacity requirement can be met with some of the free host computers belonging to the same HSs.

8. The computer-implemented method of claim 7, further comprising:
   when the new capacity requirement cannot be met with the free host computers belonging to the same HSs, adding to the workload domain the free hosts belonging to the HSs with storage size between smallest and largest storage sizes already present in the workload domain until the new capacity requirement can be met with some of the free host computers belonging to those HSs.

9. A non-transitory computer-readable storage medium containing program instructions for automatically selecting of a plurality of hosts for a workload domain, wherein execution of the program instructions by one or more processors of a computer system causes the one or more processors to perform steps comprising:
   receiving a capacity requirement for a workload domain;
   obtaining a plurality of hardware specifications (HSs) for a plurality of free host computers in the computing environment, the HSs specifying at least CPU information, storage configuration and memory size;
   when the capacity requirement cannot be met with the free host computers belonging to one of the HSs, forming a plurality of hardware groups (HGs) from the HSs, wherein each HG includes multiple HSs;
   identifying a particular HG from the HGs that can meet the capacity requirement with the free hosts belonging to the HSs of the particular HG; and
   deploying the workload domain using at least some of the free hosts belonging to the HSs of the particular HG.

10. The non-transitory computer-readable storage medium of claim 9, wherein the steps further comprise:
    when the capacity requirement can be met with the free host computers belonging to a particular HS of the HSs, deploying the workload domain using at least some of the free hosts belonging to that particular HS.

11. The non-transitory computer-readable storage medium of claim 9, wherein the steps further comprise:
    ordering the HSs using at least one of a storage criteria value and an expansion criteria value; and
    determining whether the capacity requirement can be met with the free host computers belonging to each of the HSs in an order resulting from the ordering.

12. The non-transitory computer-readable storage medium of claim 9, wherein the steps further comprise:
    ordering the HGs using at least one of a storage criteria value and an expansion criteria value; and
    determining whether the capacity requirement can be met with the free host computers belonging to each of the HGs in an order resulting from the ordering.

13. The non-transitory computer-readable storage medium of claim 9, wherein deploying the workload domain using at least some of the free hosts belonging to the HSs of the particular HG comprises:
    ordering the HSs of the particular HG by storage size;
    forming a plurality of host cluster groups by adding some of the HSs of the particular HGs to the host cluster groups; and
    deploying the workload domain using at least some of the free hosts belonging to the HSs of one of the host cluster groups.

14. The non-transitory computer-readable storage medium of claim 13, wherein forming the plurality of host cluster groups includes adding the HSs of the particular HGs to a particular host cluster group of the host cluster groups one by one until the capacity requirement can be met with some of the free host computers belonging to that particular cluster group.

15. The non-transitory computer-readable storage medium of claim 9, wherein the steps further comprise:
after forming the workload domain, obtaining a new capacity requirement for the workload domain; and
adding to the workload domain the free hosts belonging to the same HSs already used for the workload domain until the new capacity requirement can be met with some of the free host computers belonging to the same HSs.

16. The non-transitory computer-readable storage medium of claim 15, wherein the steps further comprise:
when the new capacity requirement cannot be met with the free host computers belonging to the same HSs, adding to the workload domain the free hosts belonging to the HSs with storage size between smallest and largest storage sizes already present in the workload domain until the new capacity requirement can be met with some of the free host computers belonging to those HSs.

17. A system comprising:
memory; and
at least one processor configured to:
receive a capacity requirement for a workload domain;
obtain a plurality of hardware specifications (HSs) for a plurality of free host computers in the computing environment, the HSs specifying at least CPU information, storage configuration and memory size;
when the capacity requirement cannot be met with the free host computers belonging to one of the HSs, form a plurality of hardware groups (HGs) from the HSs, wherein each HG includes multiple HSs;
identify a particular HG from the HGs that can meet the capacity requirement with the free hosts belonging to the HSs of the particular HG; and
deploy the workload domain using at least some of the free hosts belonging to the HSs of the particular HG.

18. The system of claim 17, wherein the at least one processor is further configured to:
when the capacity requirement can be met with the free host computers belonging to a particular HS of the HSs, deploy the workload domain using at least some of the free hosts belonging to that particular HS.

19. The system of claim 17, wherein the at least one processor is further configured to:
order the HGs using at least one of a storage criteria value and an expansion criteria value; and
determine whether the capacity requirement can be met with the free host computers belonging to each of the HGs in an order resulting from the ordering.

20. The system of claim 17, wherein the at least one processor is further configured to:
order the HSs of the particular HG by storage size;
form a plurality of host cluster groups by adding some of the HSs of the particular HGs to the host cluster groups; and
deploying the workload domain using at least some of the free hosts belonging to the HSs of one of the host cluster groups to deploy the workload domain using at least some of the free hosts belonging to the HSs of the particular HG.

* * * * *